H. L. BOCK.
ROLLER BEARING.
APPLICATION FILED JULY 16, 1912.

1,177,595.

Patented Apr. 4, 1916.

WITNESSES:

INVENTOR
Henry L. Bock,
BY
ATTORNEY

UNITED STATES PATENT OFFICE.

HENRY L. BOCK, OF TOLEDO, OHIO, ASSIGNOR TO WILLIAM EMIL BOCK, OF TOLEDO, OHIO.

ROLLER-BEARING.

1,177,595.

Specification of Letters Patent.

Patented Apr. 4, 1916.

Application filed July 16, 1912. Serial No. 709,736.

*To all whom it may concern:*

Be it known that I, HENRY L. BOCK, a citizen of the United States of America, residing at Toledo, in the county of Lucas and State of Ohio, have invented certain new and useful Improvements in Roller-Bearings, of which the following is a specification, reference being had therein to the accompanying drawings.

The invention relates to roller bearings adapted to carry both radial loads and end thrust, and the construction is particularly designed for use where the end thrust stress is in the preponderance.

To this end the invention consists in the peculiar construction of a series of bearings, each comprising conical rolls and coöperating conical race members, together with means for holding the rolls from longitudinal movement, as hereinafter set forth.

Figure 2:
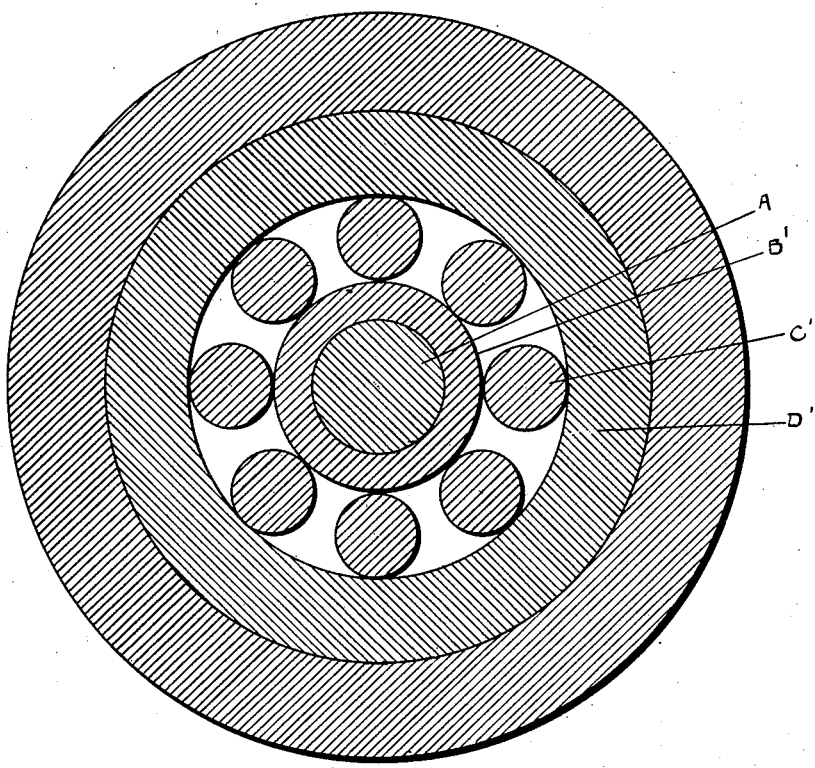
Figure 1:
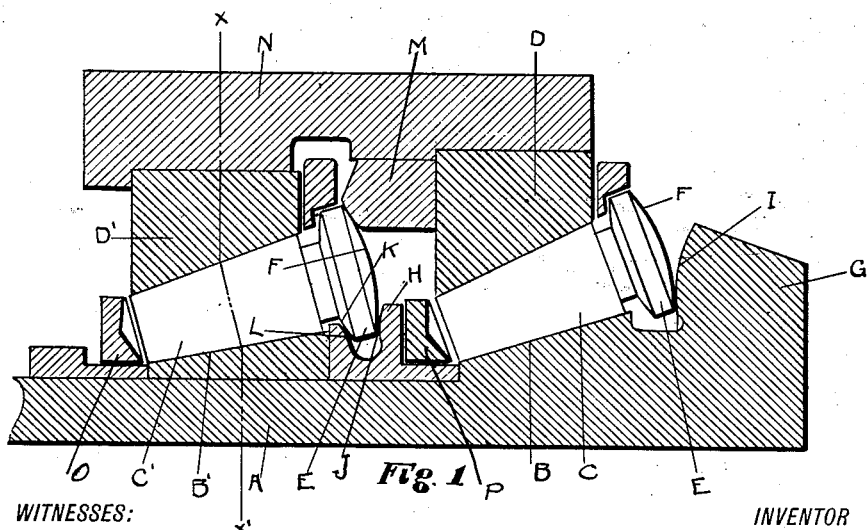

In the drawings: Figure 1 is a longitudinal section through the bearing; and Fig. 2 is a cross section on line $x$—$x$ Fig. 1.

A is a rotatable member such as a shaft, and which is subjected to both end thrust and radial load, with the former in the preponderance.

B B' are conical bearing surfaces upon the members A and D', arranged in longitudinal series; C C' are conical rolls arranged in circumferential series surrounding the bearing surfaces B and B'; and D D' are conical race members for coöperating with the rolls C C' and conical bearings B B'. Both series of rolls C and C' are arranged to converge toward a point in the axis of the rotatable member, so that all portions of the contacting surfaces will travel at the same relative speeds. The angle of convergence is however preferably different in the two series, the obliquity of the rolls C being greater than that of the rolls C'. Thus the rolls C are arranged at the more favorable angle for receiving the end thrust, while the rolls C', by being relieved of end thrust, are more favorable to the carrying of radial loads.

To retain the rolls from endwise displacement without retarding their free rolling action, each roll is provided with a head E at its large end, which latter is provided with a spherical end surface F transverse to the cone of which the conical roll surface is a part and extending both within and without said cone.

G and H are members upon the revoluble member A, having surfaces I and J which are tangent to the spherical surface F at points in the intersections of said cones with the respective spherical surfaces, and which therefore prevent endwise movement of the roll without any differential speed or rubbing action thereupon. Either one or both of the members G and H may also tangentially engage the surfaces upon opposite sides of the heads E, and, as shown, the member H is provided with a surface L for engaging a spherical surface K on the head E, being tangent thereto at a point in the intersection of the cone of which the respective conical roll surface is a part with the spherical surface K.

With the construction described in operation, the end thrust is transmitted from the conical surfaces B B' through the rolls to the conical race members D D', while the wedging out of the rolls from between said surfaces is prevented by the rolling contact of the spherical surfaces F with the tangential surfaces I J. Both circular series of rolls also carry radial loads. Where thrust is exerted in the opposite direction this will be resisted by the engagement of the surfaces K and L, while a member M tangentially engaging the surface J at a point in alinement with the outer bearing of the roll, will transmit said thrust to a member N fixed thereto and to the race members D and D'. Suitable cage members O and P are arranged to retain the rolls in proper spaced relation.

What I claim as my invention is:

1. A roller bearing comprising a rotatable member, a plurality of circumferential series of conical rolls thereabout, arranged at different points in the length thereof and at different angles of obliquity, conical bearings upon said rotatable member for engaging said rolls, conical race members surrounding said rolls, a head at the large end of each roll, having a spherical surface transverse to the cone of which the conical roll surface is a part, and a member having a surface tangent to said spherical surface at a point in the intersection of said cone with said spherical surface for resisting endwise displacement of the roll.

2. A roller bearing, comprising a rotatable member, a plurality of circumferential series of conical rolls surrounding said rotatable member and arranged longitudinally thereof and at different points in its length, the axes of said rolls extending in the same general direction but at different angles of obliquity, conical bearings upon said rotatable member for engaging said rolls, conical race members surrounding said rolls, and means in true rolling contact with said rolls for retaining the same from endwise displacement.

3. A roller bearing, comprising a rotatable member, a plurality of circumferential series of conical rolls surrounding said rotatable member at different points in the length thereof, a portion of said rolls provided with heads each having a spherical surface transverse to the cone of which the conical roll surface is a part, the remaining rolls provided with heads each having opposed spherical surfaces transverse to the circle of projection of the conical roll surface thereupon, a member upon said rotatable member having a surface tangent to the spherical surface of the first mentioned portion of rolls at points in the intersections of their respective cones with the respective spherical surfaces; a second member upon said rotatable member having opposed surfaces tangent to the opposed spherical surfaces of the remaining rolls at points in the intersection of their respective cones with the respective spherical surfaces, and conical race members surrounding said rolls.

In testimony whereof I affix my signature in presence of two witnesses.

HENRY L. BOCK.

Witnesses:
JAMES P. BARRY,
H. E. BOWMAN.